US009871617B2

(12) United States Patent
Teague et al.

(10) Patent No.: US 9,871,617 B2
(45) Date of Patent: *Jan. 16, 2018

(54) METHOD OF OPTIMIZING PORTIONS OF A FRAME

(71) Applicant: QUALCOMM Incorporated, San Diego, CA (US)

(72) Inventors: Edward Harrison Teague, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,858

(22) Filed: Sep. 23, 2016

(65) Prior Publication Data

US 2017/0012734 A1 Jan. 12, 2017

Related U.S. Application Data

(63) Continuation of application No. 14/543,721, filed on Nov. 17, 2014, now Pat. No. 9,480,074, which is a
(Continued)

(51) Int. Cl.
*H04L 1/00* (2006.01)
*H04W 72/08* (2009.01)
*H04L 1/18* (2006.01)

(52) U.S. Cl.
CPC .......... *H04L 1/0003* (2013.01); *H04L 1/0025* (2013.01); *H04L 1/0033* (2013.01);
(Continued)

(58) Field of Classification Search
CPC ... H04L 1/0009; H04L 1/0025; H04L 1/0026; H04L 1/0075; H04L 69/22; H04L 1/0046;
(Continued)

(56) References Cited

U.S. PATENT DOCUMENTS 4,346,473 A 8/1982 Davis
4,574,374 A 3/1986 Scordo
(Continued)

FOREIGN PATENT DOCUMENTS

CL 200002979 10/2001
CL 200003469 11/2001
(Continued)

OTHER PUBLICATIONS

European Search Report—EP10176002—Search Authority—Munich—dated Jul. 14, 2017.
(Continued)

*Primary Examiner* — Awet Haile
(74) *Attorney, Agent, or Firm* — Patterson & Sheridan, LLP

(57) ABSTRACT

Methods and apparatus for transmitting modulation parameters are disclosed. The apparatus and methods provide determination of when a particular modulation scheme is used by an access point. One or more modulation parameters associated with the particular modulation scheme and one or more timing values associated with the particular modulation scheme are then determined and transmitted using a portion of a broadcast channel transmitted by the access point.

12 Claims, 4 Drawing Sheets

Related U.S. Application Data continuation of application No. 11/020,412, filed on Dec. 22, 2004, now Pat. No. 8,891,349.

(60) Provisional application No. 60/590,538, filed on Jul. 23, 2004.

(52) U.S. Cl.
CPC ......... *H04W 72/085* (2013.01); *H04L 1/0026* (2013.01); *H04L 1/1812* (2013.01)

(58) Field of Classification Search
CPC ... H04L 1/0081; H04L 69/24; H04L 12/5695; H04L 5/0096; H04W 28/06; H04W 28/18; H04B 7/15528
See application file for complete search history.

(56) References Cited

U.S. PATENT DOCUMENTS

| | | |
|---|---|---|
| 4,617,657 A | 10/1986 | Drynan et al. |
| 4,850,036 A | 7/1989 | Smith |
| 4,991,184 A | 2/1991 | Hashimoto |
| 5,237,586 A | 8/1993 | Bottomley |
| 5,282,222 A | 1/1994 | Fattouche et al. |
| 5,299,199 A | 3/1994 | Wilson et al. |
| 5,408,496 A | 4/1995 | Ritz et al. |
| 5,416,780 A | 5/1995 | Patel |
| 5,511,233 A | 4/1996 | Otten |
| 5,519,130 A | 5/1996 | Byrom et al. |
| 5,519,730 A | 5/1996 | Jasper et al. |
| 5,592,548 A | 1/1997 | Sih |
| 5,615,213 A | 3/1997 | Griefer |
| 5,625,877 A | 4/1997 | Dunn et al. |
| 5,694,389 A | 12/1997 | Seki et al. |
| 5,732,351 A | 3/1998 | Olds et al. |
| 5,768,531 A | 6/1998 | Lin |
| 5,822,700 A | 10/1998 | Hult et al. |
| 5,867,478 A | 2/1999 | Baum et al. |
| 5,889,759 A | 3/1999 | McGibney |
| 5,920,547 A | 7/1999 | Werth |
| 5,983,099 A | 11/1999 | Yao et al. |
| 5,995,494 A | 11/1999 | Horikawa |
| 6,005,852 A | 12/1999 | Kokko et al. |
| 6,021,124 A | 2/2000 | Haartsen |
| 6,052,377 A | 4/2000 | Ohmi et al. |
| 6,097,711 A | 8/2000 | Okawa et al. |
| 6,104,926 A | 8/2000 | Hogg et al. |
| 6,105,064 A | 8/2000 | Davis et al. |
| 6,134,434 A | 10/2000 | Krishnamurthi et al. |
| 6,141,550 A | 10/2000 | Ayabe et al. |
| 6,157,839 A | 12/2000 | Cerwall et al. |
| 6,172,971 B1 | 1/2001 | Kim |
| 6,173,016 B1 | 1/2001 | Suzuki |
| 6,188,717 B1 | 2/2001 | Kaiser et al. |
| 6,222,828 B1 | 4/2001 | Ohlson et al. |
| 6,263,205 B1 | 7/2001 | Yamaura et al. |
| 6,285,665 B1 | 9/2001 | Chuah |
| 6,333,937 B1 | 12/2001 | Ryan |
| 6,347,091 B1 | 2/2002 | Wallentin et al. |
| 6,367,045 B1 | 4/2002 | Khan et al. |
| 6,369,758 B1 | 4/2002 | Zhang |
| 6,377,587 B1 | 4/2002 | Grivna |
| 6,377,809 B1 | 4/2002 | Rezaiifar et al. |
| 6,430,412 B1 | 8/2002 | Hogg et al. |
| 6,430,724 B1 | 8/2002 | Laneman et al. |
| 6,434,201 B1 | 8/2002 | Ohno |
| 6,447,210 B1 | 9/2002 | Coombs |
| 6,449,245 B1 | 9/2002 | Ikeda et al. |
| 6,466,591 B1 | 10/2002 | See et al. |
| 6,473,393 B1 | 10/2002 | Ariyavisitakul et al. |
| 6,473,418 B1 | 10/2002 | Laroia et al. |
| 6,473,467 B1 | 10/2002 | Wallace et al. |
| 6,477,210 B2 | 11/2002 | Chuang et al. |
| 6,487,235 B2 | 11/2002 | Hoole |
| 6,487,252 B1 | 11/2002 | Kleider et al. |
| 6,505,253 B1 | 1/2003 | Chiu et al. |
| 6,515,997 B1 | 2/2003 | Feltner et al. |
| 6,522,886 B1 | 2/2003 | Youngs et al. |
| 6,532,227 B1 | 3/2003 | Leppisaari et al. |
| 6,532,256 B2 | 3/2003 | Miller |
| 6,535,715 B2 | 3/2003 | Dapper et al. |
| 6,545,997 B1 | 4/2003 | Boehnke et al. |
| 6,549,561 B2 | 4/2003 | Crawford |
| 6,563,858 B1 | 5/2003 | Fakatselis et al. |
| 6,567,374 B1 | 5/2003 | Bohnke et al. |
| 6,567,397 B1 | 5/2003 | Campana, Jr. et al. |
| 6,594,320 B1 | 7/2003 | Sayeed |
| 6,597,680 B1 | 7/2003 | Lindskog et al. |
| 6,597,745 B1 | 7/2003 | Dowling |
| 6,597,918 B1 | 7/2003 | Kim |
| 6,601,207 B1 | 7/2003 | Vanttinen |
| 6,603,801 B1 | 8/2003 | Andren et al. |
| 6,618,454 B1 | 9/2003 | Agrawal et al. |
| 6,633,616 B2 | 10/2003 | Crawford |
| 6,636,568 B2 | 10/2003 | Kadous |
| 6,643,281 B1 | 11/2003 | Ryan |
| 6,650,629 B1 | 11/2003 | Takahashi et al. |
| 6,654,429 B1 | 11/2003 | Li |
| 6,658,619 B1 | 12/2003 | Chen |
| 6,661,832 B1 | 12/2003 | Sindhushayana et al. |
| 6,665,309 B2 | 12/2003 | Hsu et al. |
| 6,668,159 B1 | 12/2003 | Olofsson et al. |
| 6,674,792 B1 | 1/2004 | Sugita |
| 6,697,347 B2 | 2/2004 | Ostman et al. |
| 6,700,865 B1 | 3/2004 | Yamamoto et al. |
| 6,724,813 B1 | 4/2004 | Jamal et al. |
| 6,731,614 B1 | 5/2004 | Ohlson et al. |
| 6,741,634 B1 | 5/2004 | Kim et al. |
| 6,751,187 B2 | 6/2004 | Walton et al. |
| 6,801,564 B2 | 10/2004 | Rouphael et al. |
| 6,813,478 B2 | 11/2004 | Glazko et al. |
| 6,876,694 B2 | 4/2005 | Komatsu |
| 6,878,694 B2 | 4/2005 | Doshi et al. |
| 6,885,645 B2 | 4/2005 | Ryan et al. |
| 6,888,805 B2 | 5/2005 | Bender et al. |
| 6,907,246 B2 | 6/2005 | Xu et al. |
| 6,909,761 B2 | 6/2005 | Kloos et al. |
| 6,928,062 B2 | 8/2005 | Krishnan et al. |
| 6,928,065 B2 | 8/2005 | Logalbo et al. |
| 6,975,647 B2 | 12/2005 | Neale et al. |
| 6,977,974 B1 | 12/2005 | Geraniotis et al. |
| 6,990,142 B2 | 1/2006 | Chappaz |
| 6,996,195 B2 | 2/2006 | Kadous |
| 6,996,401 B2 | 2/2006 | Agin |
| 7,009,960 B2 | 3/2006 | Ho |
| 7,020,110 B2 | 3/2006 | Walton et al. |
| 7,027,429 B2 | 4/2006 | Laroia et al. |
| 7,027,523 B2 | 4/2006 | Jalali et al. |
| 7,039,001 B2 | 5/2006 | Krishnan et al. |
| 7,039,004 B2 | 5/2006 | Sun et al. |
| 7,042,429 B2 | 5/2006 | Miyazawa et al. |
| 7,042,857 B2 | 5/2006 | Krishnan et al. |
| 7,042,869 B1 | 5/2006 | Bender |
| 7,046,651 B2 | 5/2006 | Terry |
| 7,054,902 B2 | 5/2006 | Toporek et al. |
| 7,058,134 B2 | 6/2006 | Sampath |
| 7,061,915 B2 | 6/2006 | Seidel et al. |
| 7,061,916 B2 | 6/2006 | Herron et al. |
| 7,062,276 B2 | 6/2006 | Xu et al. |
| 7,068,703 B2 | 6/2006 | Maric |
| 7,072,413 B2 | 7/2006 | Walton et al. |
| 7,089,024 B2 | 8/2006 | Kim, II et al. |
| 7,092,459 B2 | 8/2006 | Sendonais et al. |
| 7,099,296 B2 | 8/2006 | Belcea |
| 7,099,299 B2 | 8/2006 | Liang et al. |
| 7,099,622 B2 | 8/2006 | Meyer et al. |
| 7,103,823 B2 | 9/2006 | Nemawarkar et al. |
| 7,127,012 B2 | 10/2006 | Han et al. |
| 7,133,460 B2 | 11/2006 | Bae et al. |
| 7,139,304 B2 | 11/2006 | Jou |
| 7,139,320 B1 | 11/2006 | Singh et al. |
| 7,177,297 B2 | 2/2007 | Agrawal et al. |
| 7,180,879 B2 | 2/2007 | Sinnarajah et al. |

(56) References Cited

U.S. PATENT DOCUMENTS

| | | |
|---|---|---|
| 7,181,170 B2 | 2/2007 | Love et al. |
| 7,181,666 B2 | 2/2007 | Grob et al. |
| 7,197,692 B2 | 3/2007 | Sutivong et al. |
| 7,218,633 B2 | 5/2007 | Donaghey |
| 7,221,680 B2 | 5/2007 | Vijayan et al. |
| 7,254,158 B2 | 8/2007 | Agrawal |
| 7,280,467 B2 | 10/2007 | Smee et al. |
| 7,283,559 B2 | 10/2007 | Cho et al. |
| 7,310,336 B2 | 12/2007 | Malkamaki |
| 7,320,043 B2 | 1/2008 | Shatas et al. |
| 7,366,272 B2 | 4/2008 | Kim et al. |
| 7,376,422 B2 | 5/2008 | Yagihashi |
| 7,395,309 B1 | 7/2008 | Lewis et al. |
| 7,411,895 B2 | 8/2008 | Laroia et al. |
| 7,430,253 B2 | 9/2008 | Olson et al. |
| 7,450,587 B2 | 11/2008 | Gruhn et al. |
| 7,453,849 B2 | 11/2008 | Teague et al. |
| 7,463,576 B2 | 12/2008 | Krishnan et al. |
| 7,464,166 B2 | 12/2008 | Larsson et al. |
| 7,474,686 B2 | 1/2009 | Ho |
| 7,519,016 B2 | 4/2009 | Lee et al. |
| 7,536,626 B2 | 5/2009 | Sutivong et al. |
| 7,551,546 B2 | 6/2009 | Ma et al. |
| 7,630,403 B2 | 12/2009 | Ho et al. |
| 7,631,247 B2 | 12/2009 | Petrovic et al. |
| 7,778,337 B2 | 8/2010 | Tong et al. |
| 8,102,832 B2 | 1/2012 | Agrawal et al. |
| 8,238,923 B2 | 8/2012 | Julian et al. |
| 8,432,803 B2 | 4/2013 | Teague et al. |
| 8,477,710 B2 | 7/2013 | Teague et al. |
| 8,611,283 B2 | 12/2013 | Teague et al. |
| 8,891,349 B2 | 11/2014 | Teague et al. |
| 9,065,608 B2 | 6/2015 | Teague et al. |
| 9,480,074 B2 | 10/2016 | Teague et al. |
| 2001/0031634 A1 | 10/2001 | Mizutani et al. |
| 2002/0004389 A1 | 1/2002 | Yi et al. |
| 2002/0032030 A1 | 3/2002 | Berglund et al. |
| 2002/0034161 A1 | 3/2002 | Deneire et al. |
| 2002/0041635 A1 | 4/2002 | Ma et al. |
| 2002/0042827 A1 | 4/2002 | Grobler et al. |
| 2002/0044540 A1 | 4/2002 | Mottier et al. |
| 2002/0119773 A1 | 8/2002 | Niemela |
| 2002/0145968 A1 | 10/2002 | Zhang et al. |
| 2002/0152315 A1 | 10/2002 | Kagan et al. |
| 2002/0160781 A1 | 10/2002 | Bark et al. |
| 2003/0031149 A1 | 2/2003 | Odenwalder et al. |
| 2003/0033417 A1 | 2/2003 | Zou et al. |
| 2003/0072255 A1 | 4/2003 | Ma et al. |
| 2003/0072267 A1 | 4/2003 | Lohtia et al. |
| 2003/0076799 A1 | 4/2003 | Kwak et al. |
| 2003/0128676 A1 | 7/2003 | Lee |
| 2003/0134655 A1 | 7/2003 | Chen et al. |
| 2003/0135640 A1 | 7/2003 | Ho et al. |
| 2003/0157900 A1 | 8/2003 | Gaal et al. |
| 2003/0161343 A1 | 8/2003 | Ghosh |
| 2003/0174662 A1 | 9/2003 | Malkamaki |
| 2003/0174700 A1 | 9/2003 | Ofek et al. |
| 2003/0214906 A1 | 11/2003 | Hu et al. |
| 2003/0214930 A1 | 11/2003 | Fischer |
| 2003/0228865 A1 | 12/2003 | Terry |
| 2004/0022176 A1 | 2/2004 | Hashimoto et al. |
| 2004/0033821 A1 | 2/2004 | Slesak et al. |
| 2004/0042508 A1 | 3/2004 | Menzel |
| 2004/0047298 A1 | 3/2004 | Yook et al. |
| 2004/0062206 A1 | 4/2004 | Soong et al. |
| 2004/0071222 A1 | 4/2004 | Liang et al. |
| 2004/0081115 A1 | 4/2004 | Parsa et al. |
| 2004/0082336 A1 | 4/2004 | Jami |
| 2004/0082356 A1 | 4/2004 | Walton et al. |
| 2004/0114552 A1 | 6/2004 | Lim et al. |
| 2004/0114566 A1 | 6/2004 | Lim et al. |
| 2004/0114618 A1 | 6/2004 | Tong et al. |
| 2004/0116125 A1 | 6/2004 | Terry |
| 2004/0118267 A1 | 6/2004 | Harrison |
| 2004/0120253 A1 | 6/2004 | Forssell et al. |
| 2004/0120342 A1 | 6/2004 | Ekl et al. |
| 2004/0120411 A1* | 6/2004 | Walton ............... H04B 7/0417 375/260 |
| 2004/0136339 A1 | 7/2004 | Wentink |
| 2004/0137863 A1 | 7/2004 | Walton et al. |
| 2004/0137943 A1 | 7/2004 | Tseng |
| 2004/0153565 A1 | 8/2004 | Bloch et al. |
| 2004/0170439 A1 | 9/2004 | Hiironen |
| 2004/0184471 A1 | 9/2004 | Chuah et al. |
| 2004/0213278 A1 | 10/2004 | Pullen et al. |
| 2004/0228353 A1* | 11/2004 | Balachandran ......... H04L 47/10 370/395.21 |
| 2004/0235472 A1 | 11/2004 | Fujishima et al. |
| 2004/0253968 A1 | 12/2004 | Chang et al. |
| 2004/0258134 A1 | 12/2004 | Cho et al. |
| 2005/0002355 A1 | 1/2005 | Takano |
| 2005/0002369 A1 | 1/2005 | Ro et al. |
| 2005/0013263 A1 | 1/2005 | Kim et al. |
| 2005/0030976 A1 | 2/2005 | Wentink |
| 2005/0068928 A1 | 3/2005 | Smith et al. |
| 2005/0069022 A1 | 3/2005 | Agrawal |
| 2005/0096061 A1 | 5/2005 | Ji et al. |
| 2005/0163194 A1 | 7/2005 | Gore et al. |
| 2005/0174931 A1 | 8/2005 | Krishnamoorthi |
| 2005/0190868 A1 | 9/2005 | Khandekar et al. |
| 2005/0239463 A1 | 10/2005 | Lagnado |
| 2005/0254555 A1 | 11/2005 | Teague et al. |
| 2005/0272432 A1 | 12/2005 | Ji et al. |
| 2005/0281219 A1* | 12/2005 | Kim .................... H04L 1/0002 370/328 |
| 2005/0281242 A1 | 12/2005 | Sutivong et al. |
| 2005/0281290 A1 | 12/2005 | Khandekar et al. |
| 2006/0018393 A1 | 1/2006 | Gore et al. |
| 2006/0019694 A1 | 1/2006 | Sutivong et al. |
| 2006/0034163 A1 | 2/2006 | Gore et al. |
| 2006/0045001 A1 | 3/2006 | Jalali |
| 2006/0114848 A1 | 6/2006 | Eberle et al. |
| 2006/0133308 A1 | 6/2006 | Madan |
| 2006/0133522 A1 | 6/2006 | Sutivong et al. |
| 2006/0203932 A1 | 9/2006 | Palanki et al. |
| 2006/0209927 A1 | 9/2006 | Khandekar et al. |
| 2006/0218302 A1 | 9/2006 | Chia et al. |
| 2006/0221810 A1 | 10/2006 | Vrcelj et al. |
| 2006/0279435 A1 | 12/2006 | Krishnan et al. |
| 2007/0150799 A1 | 6/2007 | Sutivong et al. |
| 2007/0206623 A1 | 9/2007 | Tiedemann, Jr. et al. |
| 2008/0075184 A1 | 3/2008 | Muharemovic et al. |
| 2008/0137603 A1 | 6/2008 | Teague et al. |
| 2008/0137652 A1 | 6/2008 | Herrmann et al. |
| 2008/0214121 A1 | 9/2008 | Sutivong et al. |
| 2009/0023466 A1 | 1/2009 | Sutivong et al. |
| 2009/0245421 A1 | 10/2009 | Montojo et al. |
| 2010/0002570 A9 | 1/2010 | Walton et al. |
| 2010/0034164 A1 | 2/2010 | Ho et al. |
| 2010/0182911 A1 | 7/2010 | Pullen et al. |
| 2011/0044273 A1* | 2/2011 | Maltsev ............... H04L 5/0053 370/329 |
| 2011/0064039 A1 | 3/2011 | Sutivong et al. |
| 2011/0145584 A1 | 6/2011 | Coburn et al. |
| 2011/0235685 A1 | 9/2011 | Sutivong et al. |
| 2011/0296279 A1 | 12/2011 | Sutivong et al. |
| 2012/0087336 A1 | 4/2012 | Sutivong et al. |

FOREIGN PATENT DOCUMENTS

| | | |
|---|---|---|
| CL | 200100180 | 12/2001 |
| CN | 1187930 A | 7/1998 |
| CN | 1254223 A | 5/2000 |
| CN | 1345518 A | 4/2002 |
| CN | 1394394 A | 1/2003 |
| DE | 19701011 C1 | 6/1998 |
| DE | 19747369 A1 | 5/1999 |
| DE | 10010870 | 11/2000 |
| EP | 0658028 A2 | 6/1995 |
| EP | 0768806 A2 | 4/1997 |
| EP | 0903906 | 3/1999 |
| EP | 0917316 A2 | 5/1999 |
| EP | 1043861 B1 | 6/2002 |

(56) References Cited

FOREIGN PATENT DOCUMENTS

| | | |
|---|---|---|
| EP | 1255368 A1 | 11/2002 |
| EP | 1265411 | 12/2002 |
| EP | 1286491 | 2/2003 |
| EP | 1432261 A1 | 6/2004 |
| EP | 1513272 A1 | 3/2005 |
| EP | 1919152 A2 | 5/2008 |
| GB | 2350753 | 12/2000 |
| JP | 62226741 | 10/1987 |
| JP | 04127738 | 4/1992 |
| JP | 04367135 | 12/1992 |
| JP | 07327248 | 12/1995 |
| JP | 09233047 | 9/1997 |
| JP | 9266466 | 10/1997 |
| JP | 10336159 A | 12/1998 |
| JP | 11113049 A | 4/1999 |
| JP | 11261623 A | 9/1999 |
| JP | 11331121 A | 11/1999 |
| JP | 11346203 A | 12/1999 |
| JP | 2000013353 A | 1/2000 |
| JP | 2000111631 A | 4/2000 |
| JP | 2000504908 T | 4/2000 |
| JP | 2000201134 A | 7/2000 |
| JP | 2000252947 | 9/2000 |
| JP | 2000278207 A | 10/2000 |
| JP | 2001036497 A | 2/2001 |
| JP | 2002010341 A | 1/2002 |
| JP | 2002111624 A | 4/2002 |
| JP | 2002111631 A | 4/2002 |
| JP | 2002141837 A | 5/2002 |
| JP | 2002152167 A | 5/2002 |
| JP | 2002152169 A | 5/2002 |
| JP | 2002158631 A | 5/2002 |
| JP | 2002514368 A | 5/2002 |
| JP | 2002164867 A | 6/2002 |
| JP | 2002368662 A | 12/2002 |
| JP | 2003060645 A | 2/2003 |
| JP | 2003060655 | 2/2003 |
| JP | 2003078565 A | 3/2003 |
| JP | 2003218826 A | 7/2003 |
| JP | 2003520499 T | 7/2003 |
| JP | 2003339072 A | 11/2003 |
| JP | 2004007353 A | 1/2004 |
| JP | 2004502390 A | 1/2004 |
| JP | 2004153623 | 5/2004 |
| JP | 2004159345 A | 6/2004 |
| JP | 2004529524 A | 9/2004 |
| JP | 2004312291 A | 11/2004 |
| JP | 2004537875 A | 12/2004 |
| JP | 2005508103 T | 3/2005 |
| JP | 2005512458 T | 4/2005 |
| JP | 2005536103 T | 11/2005 |
| KR | 20030017401 A | 3/2003 |
| RU | 2117396 C1 | 8/1998 |
| RU | 2213430 | 9/2003 |
| RU | 2335852 C2 | 10/2008 |
| WO | 1992010890 | 6/1992 |
| WO | 9408432 | 4/1994 |
| WO | 1996038933 | 12/1996 |
| WO | 9730526 A1 | 8/1997 |
| WO | 1998014026 | 4/1998 |
| WO | 1999014878 | 3/1999 |
| WO | 9943114 A1 | 8/1999 |
| WO | 9944316 A1 | 9/1999 |
| WO | 9966748 A1 | 12/1999 |
| WO | 0103463 A1 | 1/2001 |
| WO | 0161902 | 8/2001 |
| WO | 2001071928 | 9/2001 |
| WO | 2001076110 | 10/2001 |
| WO | 0203556 A2 | 1/2002 |
| WO | 0223814 A2 | 3/2002 |
| WO | 0237887 A1 | 5/2002 |
| WO | 0241548 A1 | 5/2002 |
| WO | 0249305 A2 | 6/2002 |
| WO | 0249306 A2 | 6/2002 |
| WO | 02073831 A1 | 9/2002 |
| WO | 02080464 A1 | 10/2002 |
| WO | 02093832 | 11/2002 |
| WO | 2003001702 | 1/2003 |
| WO | 03017526 A1 | 2/2003 |
| WO | 03019852 A1 | 3/2003 |
| WO | 03021829 A1 | 3/2003 |
| WO | 03034645 A1 | 4/2003 |
| WO | 03105510 | 12/2003 |
| WO | 2004015946 A1 | 2/2004 |
| WO | 2004040813 A1 | 5/2004 |
| WO | 2004073219 A1 | 8/2004 |
| WO | 2004079937 A2 | 9/2004 |
| WO | 2004102815 A2 | 11/2004 |
| WO | 2004102816 A2 | 11/2004 |
| WO | 2005074184 A2 | 8/2005 |
| WO | 2006020030 A1 | 2/2006 |
| WO | 06022876 | 3/2006 |

OTHER PUBLICATIONS

Cai, X., et al., "Group-orthogonal multi-carrier CDMA", Military Communications Conference. MILCOM 2002. Proceedings. Anaheim, CA, Oct. 7-10, 2002; [IEEE Military Communications Conference], New York, NY: IEEE; US, vol. 1, Oct. 7, 2002 (Oct. 7, 2002), pp. 596-601, XP010632171, DOI: 10.1109/MILCOM.2002.1180511 ISBN: 978-0-7803-7625-0, Sections I-III.

Cao, E., et al., "Analysis of Two Receiver Schemes for Interleaved OFDMA Uplink," Conference Record of the Thirty-Sixth Asilomar Conference onSignals, Systems and Computers, 2002. Nov. 3, 2002, vol. 2, pp. 1818-1821.

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Elkashlan M. et al, Performance of Frequency-Hopping Multicarrier CDMA on a Uplink with Conference Proceedings, San Francisco, CA Dec. 1-5, 2003, IEEE Global Telecommunications Conference, NY, NY, IEEE, US, vol. 7 of 7, Dec. 1, 2003, pp. 3407-3411.

Gromakov, Ju.A., "Standards and Systems of Mobile Communications (Mobile Radio Communication Standards and Systems)" Moscow: Mobilnye Telesistemy—Eko Trands, 1997, pp. 59-61.

Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.

IEEE Communications Magazine, Apr. 2002, David Falconer et al., Frequency Domain Equalization for Single-Carrier Broadband Wireless Systems, pp. 58-66.

International Search Report and Written Opinion—PCT/US2005/023978, International Search Authority—European Patent Office, dated Dec. 9, 2005.

Kapoor, S., et al., "Pilot assisted synchronization for wireless OFDM systems over fast time varying fading channels," Proceedings of the 48th Vehicular Technology Conference (VTC '98). Ottawa, Canada, May 18, 1998, vol. 3, pp. 2077-2080.

Miller, L. et al., "Cumulative acknowledgement multicast repetition policy for wireless LANs or ad hoc network clusters," IEEE, Wireless Communication Technologies Group National Institute of Standards and Technology, Maryland Gaithersburg, pp. 3403-3407, (2002).

Miyoshi, M. et al.,"Performance Improvement of TCP in wireless cellular network based acknowledgement control", Department of Infomatics and Mathematical Science, Graduate School of Engineering Science, Osaka University, Japan, Proceedings of the 7th Asia Pacific, pp. 1-15, (2001).

Sudarshan Roa , Subramanian Vasudevan Resource Allocation and Fairness for downlink shared Data channels, Mar. 16-20, 2003, 2003 IEEE. Wireless Communication and Networking, 2003 WCNC 2003, pp. 1049-1054.

Technical Specification Group Radio Access Network: "3GPP TR25.848 V4.0.0 Physical Layer Aspects of UTRA High Speed Downlink Packet Access (Release 4)" 3GPP TR 25.848 V4.0.0, Mar. 2001, pp. 1-89, XP002189517.

(56) References Cited

OTHER PUBLICATIONS

Tonello A.M. et al. "An Asynchronous Multitone Multiuser Air Interface for High-speed Uplink Communications," Vehicular Technology Conference, 2003, VTC 2003 Fall, 2003 IEEE 58th, Orlando, FL, US Oct. 6-9, 2003, Piscataway, NJ, US, IEEE, US, pp. 2267-2271.

Van De Beek et al., "A Time and Frequency Synchronization Scheme for Multiuser OFDM", Nov. 1999, IEEE Journal on Selected Areas in Communication, vol. 17, No. 11, p. 1900-1914.

Van De Beek J-J et al: "On Channel Estimation in OFDM Systems" Proceedings of The Vehicular Technology Conference. Chicago, Jul. 25-28, 1995, New York, IEEE, US, vol. 2 Conf. 45, Jul. 25, 1995 (Jul. 25, 1995), pp. 815-819, XP000551647 ISBN: 0-7803-2743-8 p. 816, left-hand column, line 20-p. 817, left-hand column, line 23 p. 818, right-hand column, line 3-line 20 figure 5.

Xu, Y., et al., "Group-orthogonal OFDMA in fast time-varying frequency-selective fading environments", 2004 IEEE 60th Vehicular Technology Conference. VTC2004-Fall (IEEE Cat. No. 04CH37575) IEEE Piscataway, NJ, USA, IEEE, vol. 1, Sep. 26, 2004 (Sep. 26, 2004), pp. 488-492, XP010788423, DOI: 10.1109/VETECF.2004.1400054 ISBN: 978-0-7803-8521-4, abstract, Sections I and III.

Yasunori, M., et al., "A Study on Adaptive Uplink Resource Control Scheme for Asymmetric Packet Radio Communication Systems using OFDMA/TDD Technique," IEICE Technical Report, vol. 100, No. 435 RCS 2000-172 (Abstract), pp. 63-70, Nov. 10, 2000.

Zhao Y., et al., "A novel channel estimation method for OFDM mobile communication systems based on pilot signals and transform-domain processing" Vehicular Technology Conference, 1997, IEEE 47th Phoenix, AZ, USA May 4-7, 1997, New York, NY, USA, IEEE, US, vol. 3, May 4, 1997 (May 4, 1997), pp. 2089-2093, XP010229166 ISBN: 0-7803-3659-3.

\* cited by examiner

METHOD OF OPTIMIZING PORTIONS OF A FRAME

CLAIM OF PRIORITY

The present Application for patent is a continuing application of, and claims the benefit of priority from, U.S. patent application Ser. No. 14/543,721 filed on Nov. 17, 2014, which in turn claims priority to U.S. patent application Ser. No. 11/020,412 filed on Dec. 22, 2004, and issued as U.S. Pat. No. 8,891,349 on Nov. 18, 2014, which in turn claims priority to Provisional Application No. 60/590,538 filed Jul. 23, 2004, all three applications being assigned to the assignee hereof and expressly incorporated herein by reference.

REFERENCE TO CO-PENDING APPLICATIONS FOR PATENT

This application is related to the U.S. patent application: U.S. application Ser. No. 10/340,507, filed on Jan. 10, 2003, now U.S. Pat. No. 6,928,062 issued Aug. 9, 2005, and assigned to the assignee hereof and expressly incorporated herein by reference.

FIELD OF INVENTION

The present invention relates generally to communication and more specifically to techniques for optimizing portions of frame.

BACKGROUND

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station communicates with base station using a reverse link.

A wireless communication system may employ multi-carrier modulation for data transmission. Common examples of multi-carrier modulation include orthogonal frequency division multiplexing (OFDM) and discrete multi-tone (DMT). OFDM effectively partitions the overall system bandwidth into a number of orthogonal subbands. Each subband is associated with a respective carrier upon which data may be modulated. The carriers for the subbands may be independently modulated with data, and the modulated carriers are then added together to generate an output waveform.

OFDM transmissions have several fundamental parameters that must be known or must be detectable by user devices (terminals) to enable demodulation of the OFDM signals. Some of the parameters should be tuned to match the specific deployment characteristics of a network to enhance performance. While it may be possible to perform "blind detection" of the settings by terminals in the network, this is difficult or expensive (in terms of computation, power, delay, etc.) process for the terminal.

Thus, there is a need for a system and method to provide fundamental parameters of the OFDM modulation to terminals outside the OFDM modulation to enable such network flexibility, and to enable terminals to quickly and easily gain access to the OFDM modulated data transmissions.

BRIEF SUMMARY

Accordingly, a method of providing modulation parameters, such as fundamental parameters of an OFDM modulation, in a communication system is disclosed. The method includes determination of when a particular modulation scheme is used in an access point. One or more modulation parameters associated with the particular modulation scheme and one or more timing values associated with the particular modulation scheme are then determined and transmitted using a portion of a broadcast channel transmitted by the access point.

A more complete appreciation of all the advantages and scope of the invention can be obtained from the accompanying drawings, the description, and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a terminal is receiving and processing data received on a given channel.

Figure 1:
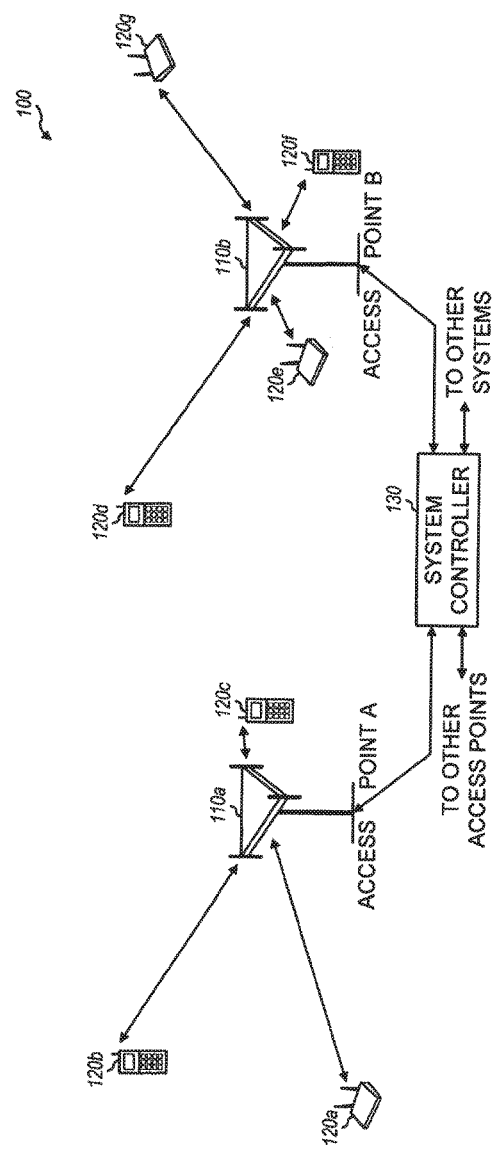
FIG. 1 shows a diagram of a wireless multiple-access communication system.

FIG. 1 shows a diagram of a wireless multiple-access communication system 100 that employs multi-carrier modulation. System 100 includes a number of access points, for example 110$a$ and 110$b$ that communicate with a number of access terminal 120$a$-120$g$. For simplicity, only two access points 110$a$ and 110$b$ and only seven access terminals 120$a$-120$g$ are shown in FIG. 1. For purpose of discussion, when referring to a single access terminal (AT) 120$x$ is used and when referring to a single access point (AP) 110$x$ will be used (AT 120$x$ and AP 110$x$ are described in FIG. 2, infra).

An access point 110$x$, is an electronic device configured to communicate with one or more access terminals and may also be referred to as a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc.

An access terminal 120x, is an electronic device configured to communicate with the access point via a communication link. The access terminal 120x may also be referred to as a terminal, a user terminal, a remote station, a mobile station, a wireless communication device, recipient terminal, or some other terminology. The access terminal, mobile terminal, user terminal, terminal are interchangeably used in the description below. Each access terminal 120x may communicate with one or multiple access points on the downlink and/or uplink at any given moment. The downlink (i.e., forward link) refers to transmission from the access point to the access terminal 120x, and the uplink (i.e., reverse link) refers to transmission from the access terminal 120x to the access point. The access terminal 120x may be any standard laptop, personal electronic organizer or assistant, a mobile phone, cellular phone, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the access terminals, and between the access terminals and other users coupled to the other systems/networks.

The techniques described herein for optimizing portions of a frame may be implemented in various wireless multiple-access multi-carrier communication systems. For example, system 100 may be an OFDMA, CDMA, GSM, WCDMA, etc. system that utilizes data transmission.

For clarity, these techniques are described for an OFDMA system that utilizes orthogonal frequency division multiplexing (OFDM). OFDM effectively partitions the overall system bandwidth into a number of (N) orthogonal frequency subbands, which are also referred to as tones, sub-carriers, bins, frequency channels, and so on. Each subband is associated with a respective sub-carrier that may be modulated with data. In the OFDMA system, multiple orthogonal "traffic" channels may be defined whereby (1) each subband is used for only one traffic channel in any given time interval and (2) each traffic channel may be assigned zero, one, or multiple subbands in each time interval. A traffic channel may be viewed as a convenient way of expressing an assignment of subbands for different time intervals. Each access terminal 120x may be assigned a different traffic channel. For each sector, multiple data transmissions may be sent simultaneously on multiple traffic channels without interfering with one another.

Figure 2:
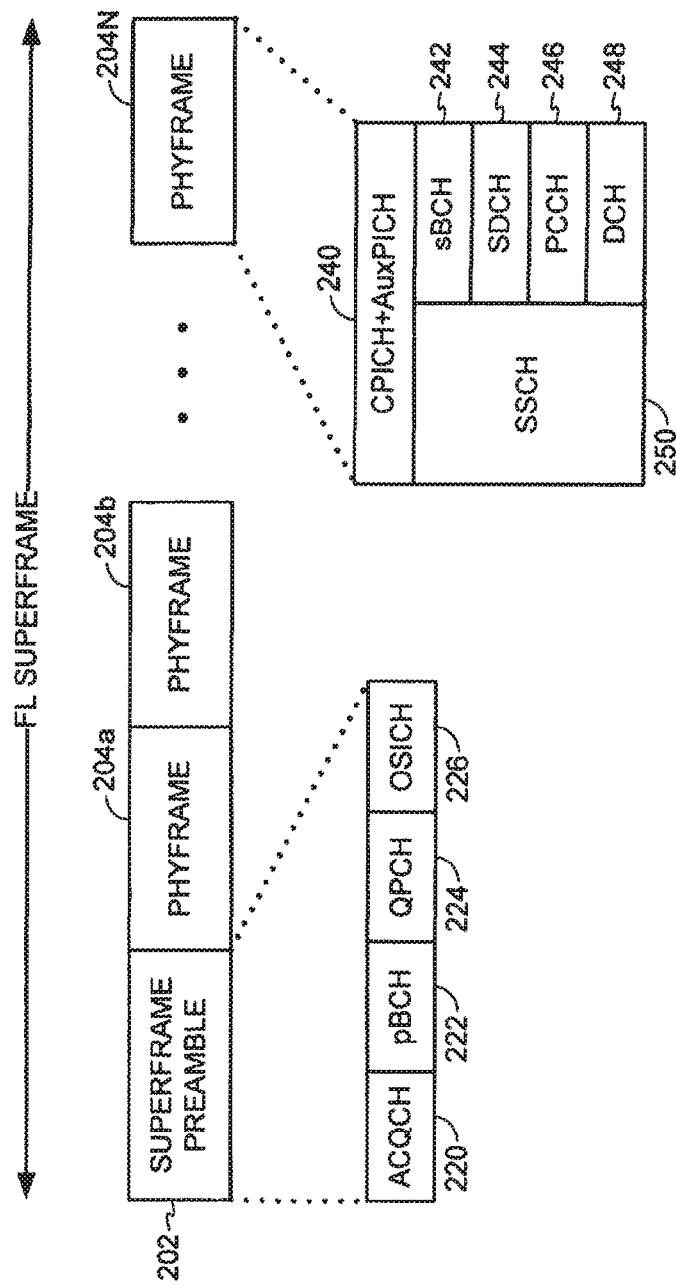
FIG. 2 illustrates a frame structure for a forward link super-frame.

FIG. 2 illustrates a frame structure 200 for a forward link super-frame of OFDMA system. In an embodiment, the forward link superframe comprises a superframe preamble portion followed by 6 PHYFrames portion. The superframe preamble portion comprises a plurality of channels, an Acquisition Channel (ACQCH) 220, a Primary Broadcast Channel (pBCH) 222 (also referred to an SYNC channel), a Quick Paging Channel (QPCH) 224, and a Other Sector Interference Channel (OSICH) 226. Each PHYFrame portion comprises a plurality of physical channels, a pilot one or more pilot channel 240 (for example a Common Pilot Channel (CPICH) and, if present, an Auxiliary Pilot Channel (AuxPICH)), a Shared Signaling Channel (SSCH) 250, a Data Channel (DCH) 248, a Secondary Broadcast Channel (sBCH) 242, a Shared Data Channel (SDCH) 244 and a Power Control Channel (PCCH) 246.

The modulation used on the forward link is Orthogonal Frequency Division Multiplexing (OFDM). Both the superframe preamble as well as each PHY Frame shall be further subdivided into units of OFDM symbols. An OFDM symbol is comprised of $N_{FFT}$ individually modulated subcarriers which carry complex-valued data.

Since orthogonal frequency division multiplexing (OFDM) is a multi-carrier transmission technique, the available spectrum is divided into many sub-carriers, each being modulated by data at a relatively low data rate. OFDM supports multiple access by allocating different sub-carriers to different users. The sub-carriers for OFDM are orthogonal and closely spaced to provide an efficient spectrum. In an embodiment, each narrow band sub-carrier may be modulated using various modulation schemes, such as quadrature phase-shift keying (QPSK) and quadrature amplitude modulation (QAM). OFDM modulation is provided using an Inverse Fast Fourier Transform (IFFT). Initially, data for transmission is mapped into quadrature-based symbols that are encoded onto the individual sub-carriers. An IFFT is performed on the set of modulated sub-carriers to produce an OFDM symbol in the time domain. Typically, a cyclic prefix is created and appended to the beginning of the OFDM symbol before it is amplified and transmitted. During reception, the OFDM symbols are processed using a fast Fourier transform (FFT) to recover the modulated sub-carriers, from which the transmitted symbols can be recovered and decoded to arrive at the transmitted data.

In an OFDM transmission can be optimized if the conditions of a particular deployment are known. For example, the number of subcarriers in the OFDM transmission (FFT size), the configuration of the guard subcarriers—the subcarriers that have been selected to be blanked to zero transmit power, the number of symbols in the cyclic prefix, the FDM pilot configuration, or the Broadcast channel configuration. Depending on the modulation scheme used, one or more parameters would be required by the recipients (the access terminals) in order to demodulate the OFDM transmissions. In an embodiment, SYNC channel is used to inform access terminals. The number of parameters carried in the SYNC channel and their exact mapping to various configurations may be specified and already known to access terminals.

As an example, the cyclic prefix length is known to affect the impact of channel delay spread on OFDMA transmissions. If it is discovered that delay spread is a problem in a certain deployment, the cyclic prefix length may be increased. The SYNC channel would be used to inform access terminals of the cyclic prefix length that is being used. If a change to the OFDM transmission parameters were desirable, the SYNC channel would be used to preannounce this change to the access terminals and provide a particular action time relative to the system time. For example, changes might only be valid every ½ hour. A change broadcast in the SYNC channel would take effect at the beginning of the following ½ hour boundary. This allows the access terminal 120x effected to prepare and make a change to their demodulation engine prior to the change.

Figure 3:
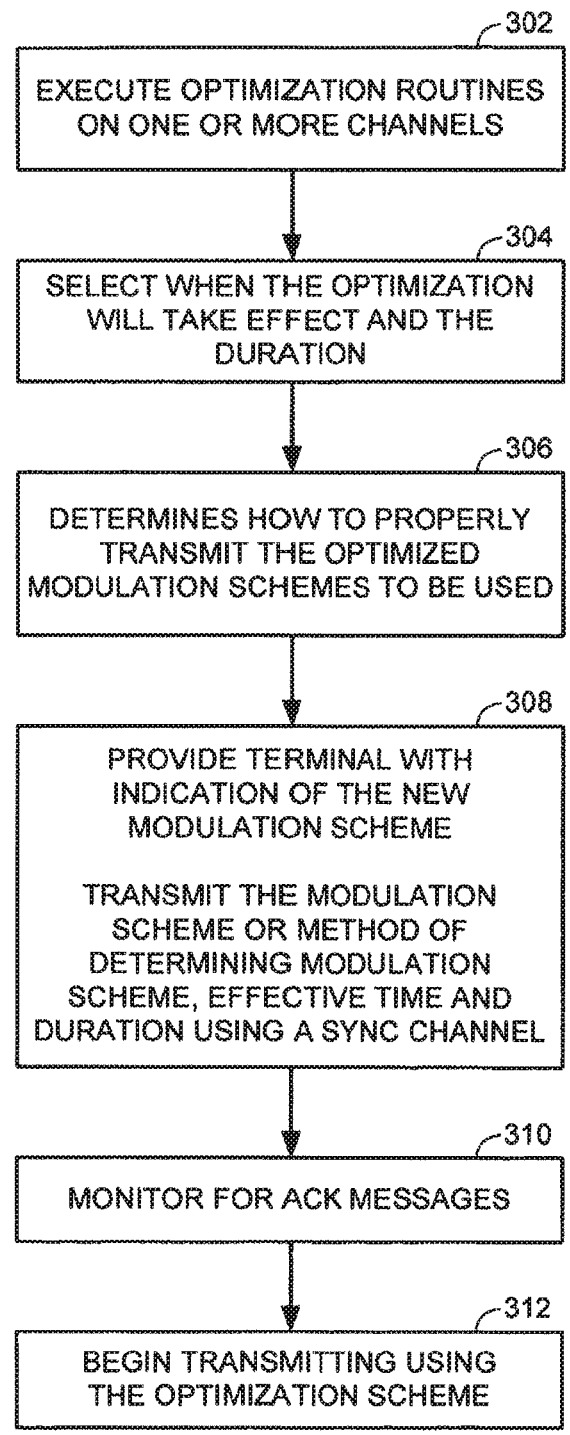
FIG. 3 illustrates a process for providing modulation parameters to the users using one or more broadcast channels.

FIG. 3 illustrates a process 300 for providing modulation parameters to the users using one or more broadcast channels. The system controller 130 may be configured to execute the steps of process 300. The AP 110x is configured to execute steps of the process 300 by utilizing at least one of various components described in FIG. 4 infra, for example, the controller 420, the scheduler 430, the memory 422, the TX data processor 414, RX data processor 434, etc. At step 302, the access point 110x determines the execution of new modulation schemes in order to optimize the communication. For example, the access point 110x may optimize bit rate for one or more the PHY channels without modifying the preamble portions of the superframe.

At step 304, based on various factors such as channel condition and bit error rate, the access point 110x further determines when the new modulation scheme will take effect and for how long. At step 306, the access point 110x determines how to properly transmit the optimized modulation schemes to be used. Depending on which channel is optimized and which modulation scheme used, the modulation parameters are packaged and transmitted using a portion of the broadcast channel. At step 308, the access point 110x using the TX Data processor 414 transmits to the access terminal 120x, the modulation parameters and a modulation schedule. The modulation schedule comprising a first time value which indicates the time when the new modulation scheme will take effect and a second time value which indicates the duration of the new modulation scheme. Generally, the access point 110x uses the broadcast channel portion of the super-frame preamble to provide the modulation parameters and the modulation schedule. The transmitted parameters may be indexes; the indexes may be used by the recipient to lookup information about the demodulation scheme. In an embodiment, the access point 110x may use an ACK/NACK and Hybrid Automatic Retransmission/Repeat Request (HARQ) schemes to insure that the recipient received the new modulation parameters before switching to the new modulation scheme. At step 310, the access point 110x monitors for ACK/NACK messages that indicate that the access terminal 110x received the new parameters. If no ACK is received the access point 110x before a predetermined time lapses or an NACK is received, the access point 110x may retransmit the new modulation parameter. Otherwise, at step 312, the access point 110x begins using the new modulation scheme at the appropriate set schedule.

In an embodiment, the process 300 may be implemented and executed by at least one component of the access terminal 120x (FIG. 4) for optimizing reverse link resources.

In an embodiment, an access terminal 120x or access point 110x may receive the optimization as receiving entity. Thus, the receiving entity provides a acknowledgement (ACK) to the transmitting entity, indicating the reception of the new optimization scheme. Upon extracting and demodulating the received parameters indicating the optimization scheme to use, the time scheme will take effect and duration of using the received optimization scheme.

Figure 4:
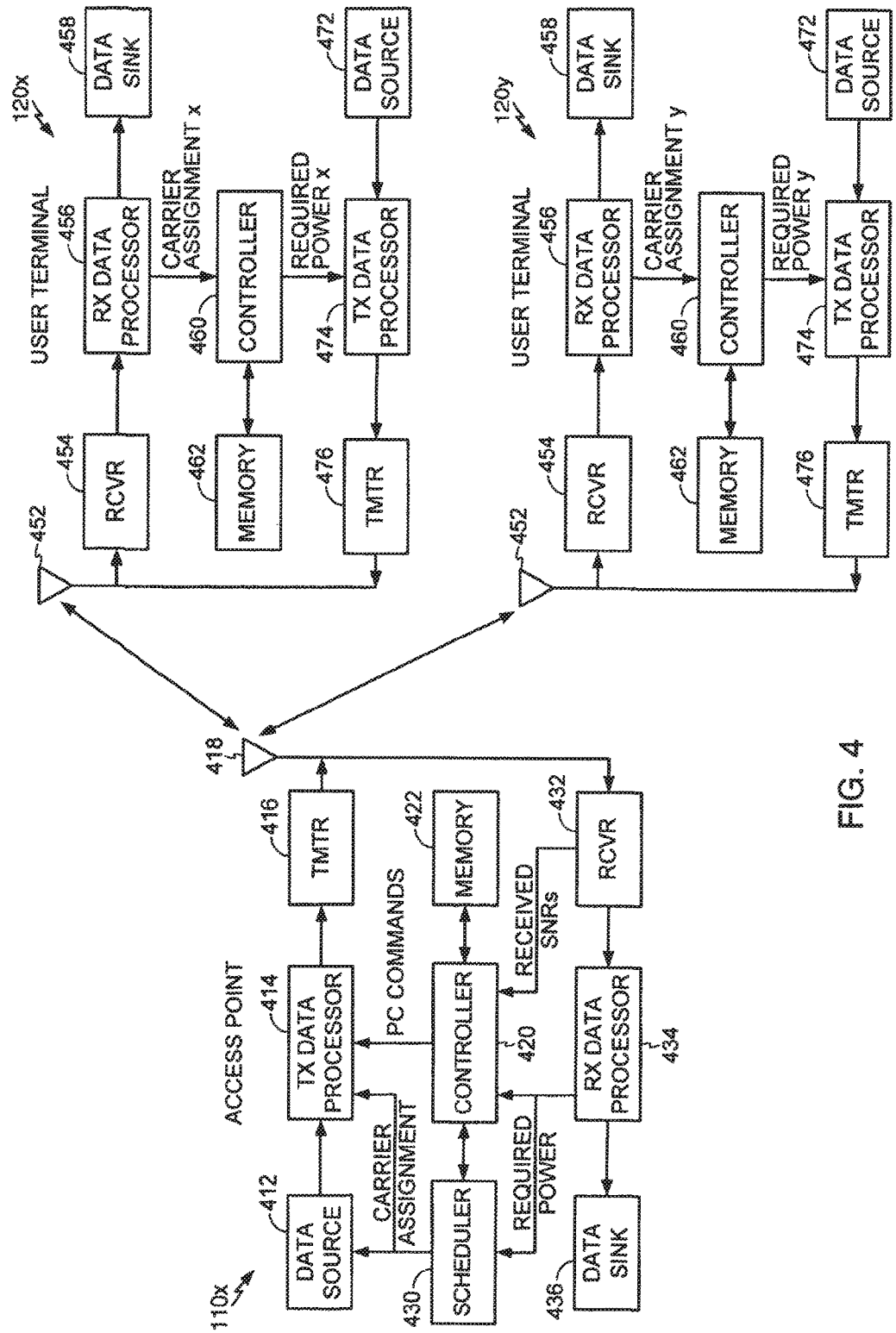
FIG. 4 a block diagram of a communication system.

FIG. 4 shows a block diagram of an embodiment of an access point 110x and two terminals 120x and 120y in multiple-access multi-carrier communication system 100. At access point 110x, a transmit (TX) data processor 414 receives traffic data (i.e., information bits) from a data source 412 and signaling and other information from a controller 420 and a scheduler 430. For example, controller 420 may provide power control (PC) commands that are used to adjust the transmit power of the active terminals, and scheduler 430 may provide assignments of carriers for the access terminals. These various types of data may be sent on different transport channels. TX data processor 414 encodes and modulates the received data using multi-carrier modulation (e.g., OFDMA) to provide modulated data. A transmitter unit (TMTR) 416 then processes the modulated data to generate a downlink modulated signal that is then transmitted from an antenna 418.

At each of terminals 120x and 120y, the transmitted and modulated signal is received by an antenna 452 and provided to a receiver unit (RCVR) 454. Receiver unit 454 processes and digitizes the received signal to provide samples. A received (RX) data processor 456 then demodulates and decodes the samples to provide decoded data, which may include recovered traffic data, messages, signaling, and so on. The traffic data may be provided to a data sink 458, and the carrier assignment and PC commands sent for the access terminal 120x are provided to a controller 460.

Controller 460 directs data transmission on the uplink using the specific carriers that have been assigned to the access terminal 120x and indicated in the received carrier assignment. Controller 460 further adjusts the transmit power used for the uplink transmissions based on the received PC commands.

For each active terminal 120x, a TX data processor 474 receives traffic data from a data source 472 and signaling and other information from controller 460. For example, controller 460 may provide information indicative of the required transmit power, the maximum transmit power, or the difference between the maximum and required transmit powers for the access terminal 120x. The various types of data are coded and modulated by TX data processor 474 using the assigned carriers and further processed by a transmitter unit 476 to generate an uplink modulated signal that is then transmitted from antenna 452.

At access point 110x, the transmitted and modulated signals from the access terminals are received by antenna 418, processed by a receiver unit 432, and demodulated and decoded by an RX data processor 434. Receiver unit 432 may estimate the received signal quality (e.g., the received signal-to-noise ratio (SNR)) for each access terminal 120x and provide this information to controller 420. Controller 420 may then derive the PC commands for each access terminal 120x such that the received signal quality for the access terminal 120x is maintained within an acceptable range. RX data processor 434 provides the recovered feedback information (e.g., the required transmit power) for each access terminal 120x to controller 420 and scheduler 430.

Scheduler 430 uses the feedback information to perform a number of functions such as (1) selecting a set of access terminals for data transmission on the reverse link and (2) assigning carriers to the selected access terminals. The carrier assignments for the scheduled access terminals are then transmitted on the forward link to these access terminals.

The techniques described herein may be implemented by various means. For example, these techniques may be implemented in hardware, software, or a combination thereof. For a hardware implementation, the processing units (e.g., controllers 420 and 470, TX and RX processors 414 and 434, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 422 in FIG. 4) and executed by processors (e.g., controllers 420). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communicating modulation parameters in a wireless communication system, the method comprising:
   determining when a particular modulation scheme is to be used;
   determining one or more modulation parameters associated with the particular modulation scheme and timing information associated with the particular modulation scheme, the timing information including information associated with indicating when the particular modulation scheme will take effect and a time duration of the particular modulation scheme; and
   transmitting the determined one or more modulation parameters and timing information using a portion of a transmission decodable by multiple users.

2. The method of claim 1, wherein the one or more modulation parameters include at least one of: a cyclic prefix length or an indication of a change of a cyclic prefix length.

3. The method of claim 1, wherein the modulation parameters include a bandwidth of a payload to be transmitted.

4. An apparatus for communicating modulation parameters in a wireless communication system, the apparatus comprising:
   means for determining when a particular modulation scheme is to be used;
   means for determining one or more modulation parameters associated with the particular modulation scheme and timing information associated with the particular modulation scheme, the timing information including information associated with indicating when the particular modulation scheme will take effect and a time duration of the particular modulation scheme; and
   means for transmitting the determined one or more modulation parameters and timing information using a portion of a transmission decodable by multiple users.

5. The apparatus of claim 4, wherein the one or more modulation parameters include at least one of: a cyclic prefix length or an indication of a change of a cyclic prefix length.

6. The apparatus of claim 4, wherein the modulation parameters include a bandwidth of a payload to be transmitted.

7. An apparatus for communicating modulation parameters in a wireless communication system, the apparatus comprising:
   at least one processor configured to:
      determine when a particular modulation scheme is to be used;
      determine one or more modulation parameters associated with the particular modulation scheme and timing information associated with the particular modulation scheme, the timing information including information associated with indicating when the particular modulation scheme will take effect and a time duration of the particular modulation scheme; and
      transmit the determined one or more modulation parameters and timing information using a portion of a transmission decodable by multiple users; and
   a memory coupled with the at least one processor.

8. The apparatus of claim 7, wherein the one or more modulation parameters include at least one of: a cyclic prefix length or an indication of a change of a cyclic prefix length.

9. The apparatus of claim 7, wherein the modulation parameters include a bandwidth of a payload to be transmitted.

10. A non-transitory computer readable medium having computer executable code stored thereon for communicating modulation parameters in a wireless communication system, comprising:
    code for determining when a particular modulation scheme is to be used;
    code for determining one or more modulation parameters associated with the particular modulation scheme and timing information associated with the particular modulation scheme, the timing information including information associated with indicating when the particular modulation scheme will take effect and a time duration of the particular modulation scheme; and
    code for transmitting the determined one or more modulation parameters and timing information using a portion of a transmission decodable by multiple users.

11. The computer readable medium of claim 10, wherein the one or more modulation parameters include at least one of: a cyclic prefix length or an indication of a change of a cyclic prefix length.

12. The computer readable medium of claim 10, wherein the modulation parameters include a bandwidth of a payload to be transmitted.

* * * * *